Figure 1:
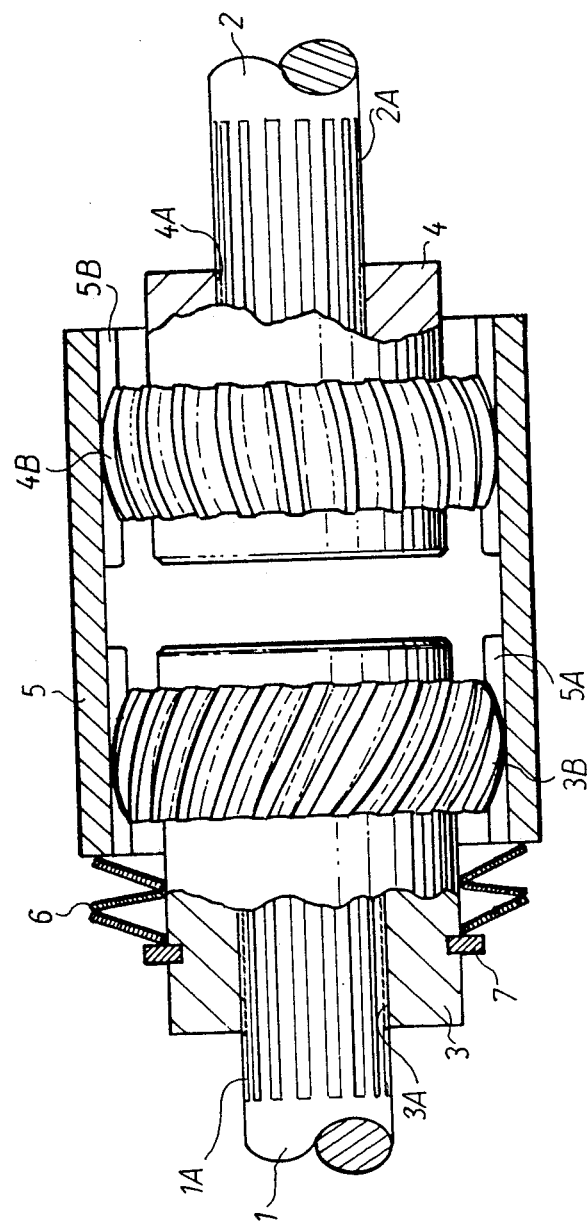

United States Patent [19]

Green

[11] Patent Number: 4,913,681
[45] Date of Patent: Apr. 3, 1990

[54] SHOCK ABSORBING ROTARY GEAR COUPLING

[76] Inventor: Paul C. Green, "Blackthorns", 35 Blackwood Rd., River Farm, Dosthill, Tamworth, Staffordshire, Great Britain

[21] Appl. No.: 194,745

[22] Filed: May 17, 1988

[30] Foreign Application Priority Data

May 18, 1987 [GB] United Kingdom ............... 8711700

[51] Int. Cl.$^4$ ............................................. F16D 3/18
[52] U.S. Cl. .................................. 464/154; 464/159; 464/161; 464/169
[58] Field of Search ............... 464/154, 158, 159, 160, 464/162, 169, 180, 161

[56] References Cited

U.S. PATENT DOCUMENTS

| | | | |
|---|---|---|---|
| 2,021,718 | 11/1935 | Fast | 464/154 X |
| 2,380,113 | 7/1945 | Kuhns | 464/154 |
| 2,785,550 | 3/1957 | Petrie | 464/158 |
| 2,873,588 | 2/1959 | Crankshaw | 464/154 |
| 2,914,929 | 12/1959 | Irons | 464/169 X |
| 3,279,216 | 10/1966 | Spaulding, Jr. | |
| 3,343,377 | 9/1967 | Loupere | 464/154 X |

FOREIGN PATENT DOCUMENTS

| | | | |
|---|---|---|---|
| 611129 | 3/1935 | Fed. Rep. of Germany | 464/154 |
| 630179 | 5/1936 | Fed. Rep. of Germany | 464/160 |
| 2135588 | 2/1973 | Fed. Rep. of Germany | |
| 2180625 | 4/1987 | United Kingdom | |

Primary Examiner—Daniel P. Stodola
Attorney, Agent, or Firm—Caesar, Rivise, Bernstein, Cohen & Pokotilow, Ltd.

[57] ABSTRACT

A gear coupling adapted to be capable of absorbing torsional shock loads between a power driven shaft 1 and a power drive shaft 2 comprises a drive member 3 and driven member 4 which extend from two sides into, and engage with, hollow intermediate member 5 so that the three members rotate in unison. The driven member 3 and preferably also the drive member 4 engage the intermediate member 5 by helical gear teeth 3B, 5A, 4B, 5B and a resilient member 6 such as a bank of disc springs is present between the drive member and the intermediate member. The coupling is arranged do that under the influence of a torsional shock load, the resultant axial separating force urges the intermediate member against the bias of the springs, to thereby reduce any damaging effects of the shock load.

6 Claims, 2 Drawing Sheets

Fig_1

SHOCK ABSORBING ROTARY GEAR COUPLING

This invention relates to a mechanical coupling, and more particularly to a coupling for joining together two substantially co-axial rotary power drive members such as drive shafts forming part of a power transmitting drive line for example of drilling equipment used in mines.

When a drill is used, eg., to drill into a coal containing substrate, there is a risk that the cutters will suddenly meet a relatively much harder material. Such an obstacle imposes a transient shock load on the drive members and can cause problems and even damage. It is one object of this invention to provide a coupling for the purpose specified which is able to cope with such transient shock loads and allow the drive members to adjust to them so that they can continue to rotate without the risk of damage. It is another object to provide such a coupling which can accommodate misalignment of the drive and driven shafts.

It is known from DE A-2135588 to locate the facing ends of a drive shaft and a driven shaft in a common coupling sleeve, each shaft being surrounded by a hub, having external teeth to engage with complementary teeth in the inner wall of the sleeve. A bow spring is present between the shafts and is compressed to ensure that the load on the drive shaft and the driven shaft are not unduly different. Such a system cannot adequately cope with larger shock loads and is generally inconvenient.

According to one aspect of the invention there is provided a gear type coupling adapted to be capable of absorbing shock, the coupling comprising a rotary drive member and a rotary driven member disposed substantially co-axial with the rotary drive member, both members extending into an intermediate drive member and in gear engagement therewith, whereby the members can rotate in unison wherein the rotary drive member is provided with external helical gear teeth which engage internal helical gear teeth provided within the intermediate member, and resilient means extend between a location on the drive member and the intermediate member, whereby when torque is transmitted through the coupling, the resultant axial separating force causes the intermediate drive member to move against the bias of the resilient means and when a shock load is applied the intermediate drive member is urged further against the bias of the resilient means.

In a much preferred feature, the driven member and the intermediate drive member cooperate by means of gear teeth of helical form.

The helix angle and hand of the helical gears of the drive member are selected so that when the drive member is subjected to a shock load, the axial force tending to separate the helical gears causes the intermediate drive member to move the resilient means by an amount such that sufficient energy (power) is absorbed to reduce the magnitude of the shock load to within predetermined safe working limits, for example, below the level at which unacceptably high external forces are applied to the associated bearings. As the shock load subsides, the energy stored within the resilient means is released back into the drive line with the effect of providing enhancement of the level of torque. The helix angle and hand of the helical gears of the driven members are preferably selected so that the axial force tending to separate the helical gears opposes and is substantially equal to the average sliding friction force generated between the helical gear teeth contact faces caused by the axial travel of the intermediate drive member, which thereby reduces the external forces applied to its support bearings.

The resilient means may be provided by a compression spring, eg. in disc form or rubber block or pneumatic or hydraulic means. The degree of resilience may be adjusted according to preset limits.

Preferably the rotary drive member and rotary driven member engage the intermediate member by means of helical gear teeth having crowned and barrelled profiles so as to accommodate any misalignment between the members.

In my GB patent publication No. 2,180,625A I have described and claimed a coupling incorporating a system to cope with misalignment between the drive shaft and the driven shaft. In the disclosed arrangement the driven shaft is received in a hub having external crowned and barrelled teeth and the hub is further engaged with a sleeve and hence the drive shaft, by means of an intermediate gear member, resiliently biased by disc springs against the hub. The disc springs are held between the intermediate member and a yieldable stop and ensure that the intermediate member remains in position under various conditions of misalignment but when the torsional force applied to the coupling exceeds and predetermined threshold, the stop yields, the disc springs are released and the coupling is disengaged. Such a system is not adapted to cope with sudden shock loads.

Figure 2:
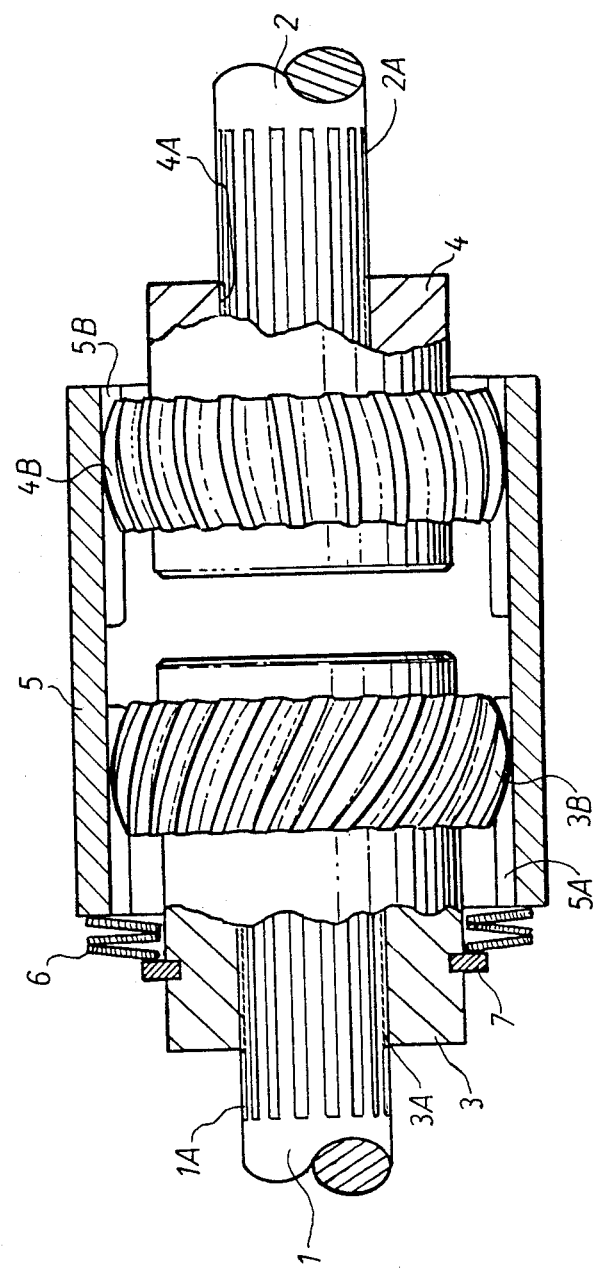

In order that the invention may be better understood it will now be described with reference to the accompanying diagrammatic drawings in which:

FIG. 1 is a longitudinal part sectional view of a coupling of the invention in normal use; and FIG. 2 is the same as FIG. 1, showing the coupling when it undergoes a transient shock load.

The coupling of the invention comprises an assembly of a rotary power drive shaft 1 and an axially aligned but slightly spaced rotary driven power shaft 2, both being present in the bore of a hollow intermediate drive member 5. The drive shaft 1 may be secured to and extend from say a motor and the driven shaft from say a cutter tool, both not shown. The free end portions of the shafts 1 and 2 are received in the bore diameter of respective gear drive and gear driven members 3 and 4. The shafts 1 and 2 have external splines 1A and 2A respectively which engage complementary splines 3A and 4A of the respective gear members. Only some splines are shown. The longitudinal end portions 5A and 5B of the hollow intermediate drive member 5 are formed with helical gear teeth which concentrically engage corresponding external gear teeth 3B and 4B respectively on the gear members 3 and 4, which teeth have barrelled and crowned profiles corresponding to those of the helical teeth. A bank of disc springs 6 extends between a stop 7 on the outside of the gear drive member 3 and the facing end of the intermediate drive member 5 to urge that member towards the driven shaft. The stop 7 is secured to the gear drive member 3, and its position along that member may be adjustable to adjust the tension of the springs 6.

In use, when the rotary power drive shaft 1 is rotated by means, not shown., the helical gear teeth 3B engage those 5A of the intermediate drive member 5 which is engaged with the driven member 4 by the engagement of the respective gear teeth 5B and 4B. As a result, the driven power shaft 2 rotates in unison with the drive shaft 1. Because of the presence of the barrelled and crowned gear teeth any axial misalignment between the shafts 1 and 2 is automatically corrected. The torque transmitted by the shafts produces an axial separating force which causes the intermediate drive member 5 to move against the bias of the disc springs 6. A sudden change in the magnitude of the torque will urge the intermediate drive member 5 away from the driven shaft 2, to compress the bank of springs 6 to absorb energy, according to the extra load produced by the shock loading. This has the effect of absorbing such shock loading quickly, so that the risk of damage is reduced and the torque can automatically adjust to the new load on the driven shaft 2.

The axial movement of the intermediate drive member 5 induces a sliding friction force between the contact faces of the helical gears 4B and 5B. To offset the effect of the friction force, the helix hand and angle of the helical gears 4B and 5B is selected so that the helical gear separating force is equal and opposite in direction to the friction force so that the resultant force to be reacted by the support bearing of the drive line (not shown) is minimized. In one embodiment, the hands of the helixes oppose each other, the helix angle of the gear teeth on the drive member 3 was 38° and that on the driven member 4 was 6°, but these values may vary, depending upon the elastic constant of the disc springs 6, the nature of any lubricant present, and wear and the ability to make helical gears. These can be readily established by routine techniques.

The invention is not limited to the embodiment shown. For example, there may be a single engagement coupling (one pair of helical gears) or a cardan shaft arrangement where the helical gears are spaced apart from each other by a drive shaft. The gear drive members may be allowed to move relative to the intermediate member, and in such cases the disc springs 6 are deflected by the axial displacement of the movable member. The disc springs (6) may be prestressed to a level that they resist movement of the intermediate member, until a predetermined torque shock load has been applied to the shaft.

A coupling of the invention is able to absorb a range of transient torques and vibrations, has high hysteresis and overall compactness. The coupling may be used in any industrial drive system where there is a need to absorb transient torques or vibrations. For example, the coupling may be used to couple two machines which have irregular torque or speed variations.

What is claimed:

1. A gear coupling adapted to absorb torsional shock loads and axial misalignment between two rotary members, the coupling comprising a first rotary member, a second rotary member disposed substantially coaxially with the first member, an intermediate member inbetween the first and second members, resilient means extending between the first member and the intermediate member for providing bias therebetween, external helical gear teeth being present about the first member, external helical teeth being present about the second member, internal gear teeth being present at each end of the intermediate member, the external gear teeth of the first member and the second member being in engagement with the internal gear teeth at the respective end of the intermediate member, the interengaged gear teeth on at least one of the first members, the second member and the intermediate member being crowned and barrelled so as to accommodate axial misalignment between the first and second members, the hand of the helical gear teeth on the second member opposing the hand of the teeth on the first member and the angle of the helical gear teeth of the second member being different from that of the helical gear teeth of the first member, whereby when torque is transmitted through the coupling, there is a resultant force axially separating the members so that the intermediate member is caused to move against the bias of the resilient means and so that if an increased or shock load is applied, the intermediate member is urged further against the bias of the resilient means thereby to absorb the shock load, the hand and angle of the gear teeth of the second member being selected so that the axial force tending to separate the gear teeth oppose and is substantially equal to the average sliding friction force generated between the helical gear teeth contact faces caused by the axial travel of the intermediate member.

2. A coupling according to claim 1, wherein the first member is a drive member and the second member is a driven member.

3. A coupling according to claim 2, wherein both of the pairs of gear teeth of the drive and driven member and the intermediate member have crowned and barrelled profiles.

4. A coupling according to claim 2, wherein the gear teeth of the drive member have a helix angle of about 38°.

5. A coupling according to claim 2, wherein the gear teeth of the driven member have a helix angle of about 6°.

6. A coupling according to claim 1, wherein the resilient means comprises a bank of disc springs.

* * * * *